March 7, 1967 A. AREGGER 3,307,439
COPYING ATTACHMENT FOR A MACHINE TOOL SUCH AS A
LATHE, A DRILLING MACHINE OR THE LIKE
Filed Aug. 10, 1965 3 Sheets-Sheet 1

INVENTOR
A. AREGGER
BY
Michael J. Striker
ATTORNEY

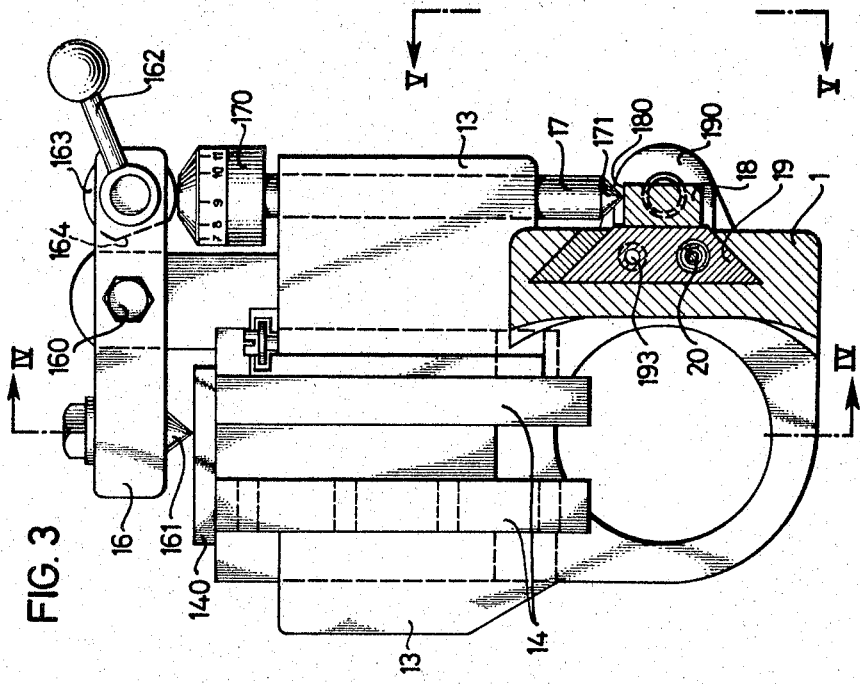
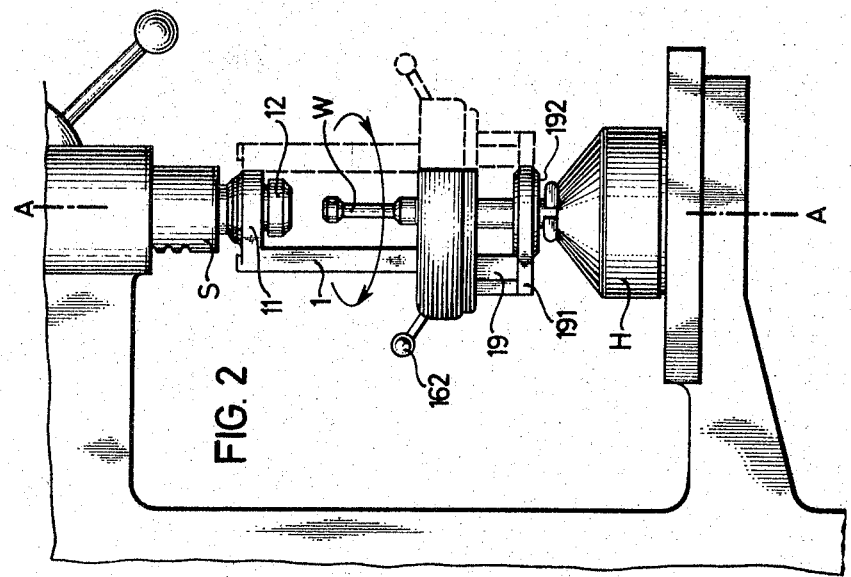

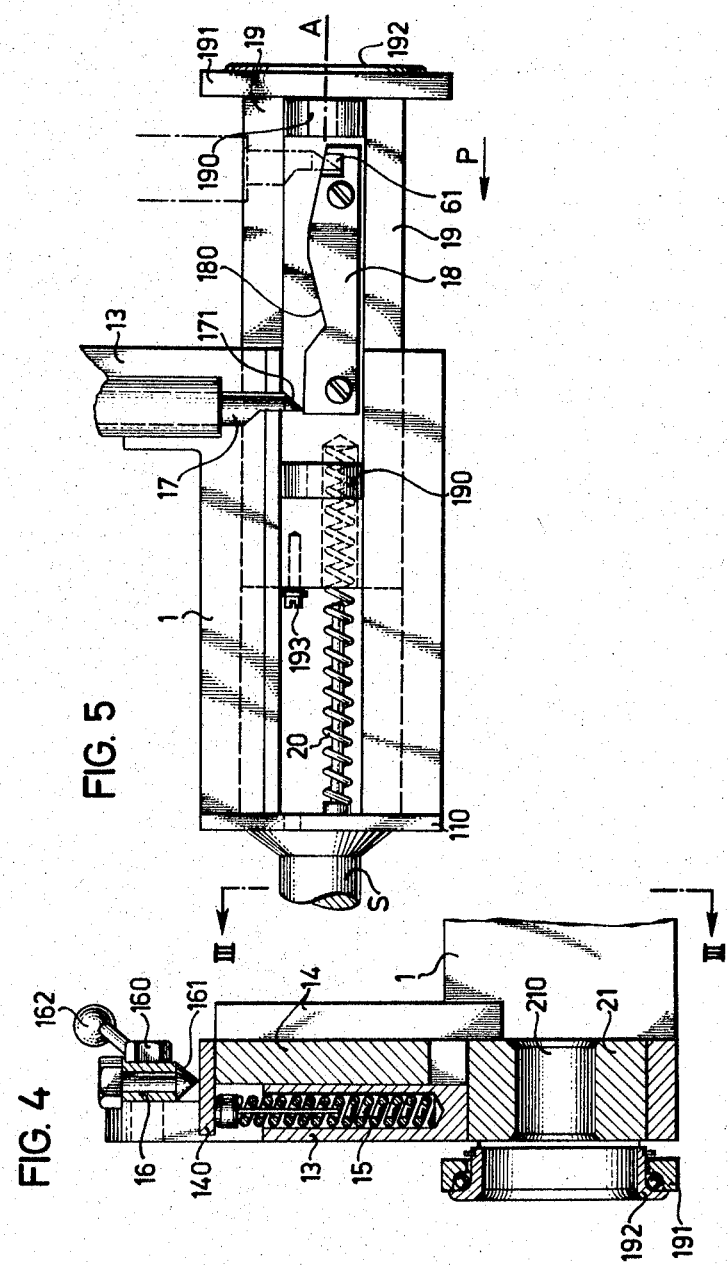

United States Patent Office 3,307,439
Patented Mar. 7, 1967

3,307,439
COPYING ATTACHMENT FOR A MACHINE TOOL SUCH AS A LATHE, A DRILLING MACHINE OR THE LIKE
Alois Aregger, St. Niklausen, Lucerne, Switzerland, assignor to Nähma AG., Zug, Switzerland
Filed Aug. 10, 1965, Ser. No. 478,547
12 Claims. (Cl. 82—14)

The present invention relates to a copying attachment for a machine tool such as a lathe, a drilling machine or the like.

Copying attachments for machine tools are known in the art which include a tool holder carrying a cutting tool and a feeler pin cooperating with a template carried by the copying attachment and operatively connected to the tool holder for moving the latter and the cutting tool carried thereby toward and away from the axis of a workpiece during movement of the cutting tool in direction along the axis and simultaneous movement of one end of the feeler pin along a control face of the template.

It is an object of the present invention to provide a copying attachment of the type mentioned which provides for an improved stability of the attachment, and perfect guiding of the movable element thereof.

It is also an object of the present invention to provide a copying attachment of the aforementioned kind which is of very compact construction and which is composed of relatively few and simple parts so that the copying attachment may be constructed at reasonable cost and will stand up trouble free under extended use.

With these objects in view, the copying attachment of the present invention comprises in combination with a machine tool such as a lathe having a head stock carrying a workpiece turnably about its axis and a tail stock movable toward the head stock, or a drilling machine having a spindle and a workpiece holder fixedly carrying the workpiece along the axis of the spindle, elongated support means adapted to be connected at one end thereof to the tail stock of the lathe, respectively to the spindle of the drilling machine, tool holder means for holding a cutting tool and being mounted in the region of the other end of the support means movable in a direction substantially normal to the axis of the workpiece carried by the machine tool toward and away from this axis, a template guide guided on the support means along a path extending substantially parallel to the aforementioned axis between an extended position and a retracted position in which one end of the template guide is closer to said other end of the support means than in the extended position, a template having an elongated control face and being fixedly mounted on the template guide with said elongated control face extending in direction of said axis, abutment ring means fixed to the one end of the template guide and having an axis coinciding with the axis of the workpiece, and adapted to partly surround the latter and to abut with an end face thereof against the head stock, respectively the workpiece holder, a feeler pin having one end engaging said control face of the template guide and being mounted on the support means movable in a direction normal to said axis, and connecting means connecting the other end of the feeler pin to the tool holder means for movement of the latter simultaneously with the feeler pin.

Preferably the copying attachment includes also resilient means operatively connected to the template guide and biased so as to tend to maintain the latter in the extended position thereof.

According to a preferred arrangement, the feeler pin and the workpiece holder means are guided in the support means movable parallel to each other and the connecting means in this case preferably include a lever pivotally mounted intermediate its ends on the support means and engaging with opposite ends the tool holder means and the end of the feeler pin opposite the end thereof which engages the control face of the template. The arrangement may also include adjustable limiting means cooperating with the template guide and the support means for limiting movement of the template guide from the extended to the retracted position. Furthermore, the arrangement may also include means cooperating with the feeler pin and the tool holder means for changing the position of the latter relative to the feeler pin for moving a cutting tool carried by the tool holder means between a roughing and a finishing position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a side view of the copying attachment mounted on a drilling machine;

FIG. 3 is a partial cross sectional view of the copying attachment viewed in the direction of the arrows III—III of FIG. 4, and drawn to an enlarged scale;

FIG. 4 is a cross sectional view taken along the line IV–IV of FIG. 3 and viewed in the direction of the arrows; and FIG. 5 is a partial side view viewed in the direction of the arrows V–V of FIG. 3.

Figure 1:
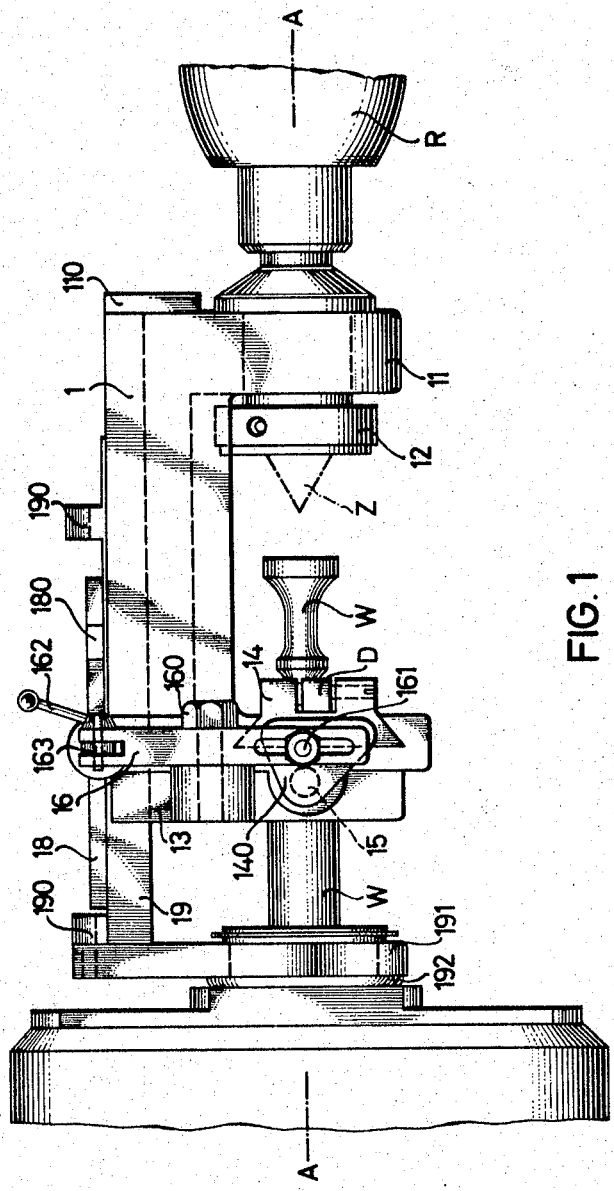
FIG. 1 is a top view of the copying attachment according to the present invention and shown mounted on a lathe.

Referring now to the drawings, it will be seen that the copying attachment of the present invention comprises elongated support means 1 having a pair of cross arms 11 and 13 extending laterally to one side and respectively from opposite ends of the elongated portion of the support means 1. FIG. 1 illustrates the cross arm 11 attached to the head of a tail stock R of a lathe, while FIG. 2 illustrates the use of the copying attachment according to the present invention in a drilling machine in which the cross arm 11 is mounted on the lower end of the spindle S of the drilling machine. The cross arm 11 is formed with a threaded bore therethrough so that it can be properly attached to a corresponding threaded portion of the dead center of the tail stock R, as shown in FIG. 1, or to the rotating spindle S of the drilling machine, as shown in FIG. 2. A clamping nut 12 engages the inner face of the cross arm 11 to properly secure the latter to a shoulder of the dead center of the tail stock R or to a corresponding shoulder on the spindle S. The other cross arm 13 of the support means 1 is formed with a dove-tailed groove extending substantially normal to the axis A—A of the machine tool, that is the lathe as shown in FIG. 1, or the drilling machine as shown in FIG. 2, and a tool holder means 14 carrying a cutting tool D fixedly secured thereto is provided with a corresponding dove-tailed portion located in the aforementioned groove so that the tool holder means is guided on the cross arm 13 movable in direction substantially normal to the axis A—A toward and away from the latter. A coil compression spring 15 arranged in the direction of the movement of the tool holder means 14 acts on a plate 140 fixed to the front end of the tool holder means 14, as best shown in FIG. 4, and tends to move the tool holder means 14 and the cutting tool D carried thereby away from the axis A—A. The coil spring 15 presses thereby the front face of the plate 140 against the pointed end of a pressure pin 161 mounted in an elongated slot provided in a double armed lever 16 and adjustable in longitudinal direction of the slot. The double armed lever 16 is pivotally mounted intermediate its ends for pivotal movement about a bearing pin 160 connected to a lug protruding from the cross arm 13. The end of the lever 16 opposite from the end on which the pin 161 is mounted carries a cam 163 having a flat cam face 164 and which is turnable about its axis by means of a handle 162 fixedly connected to the cam 163 (FIG. 3).

The coil spring 15 which tends to tilt the lever 16 in clockwise direction about the pivot pin 160 presses thereby the cam 163 against the head 170 of a feeler pin 17 which is guided in an appropriate bore of the cross arm 13 in a direction parallel to the direction of movement of the tool holder means 14 so that the lower pointed end 171 of the feeler pin 17 is pressed against the control surface 180 of a template 18. The head 170 is threadingly connected by means of a fine screw thread to the upper end of the feeler pin 17 and provided with an appropriate scale for adjusting the position of the tool holder means 14 relative to the feeler pin 17 during succeeding turning operations of the workpiece W rotatably mounted on the chuck B of the head stock of the lathe, as shown in FIG. 1, or fixedly mounted on a workpiece holder H in the drilling machine as indicated in FIG. 2.

The template 18 is fixed in any convenient manner, for instance by a pair of screws as indicated in FIG. 5, to a template guide 19 of substantially dove-tailed cross section, as best shown in FIG. 3, and guided in an elongated groove of corresponding cross section formed in the elongated portion of the support means 1 and extending parallel to the axis A—A of the machine tool. The template guide 19 has also a pair of lugs 190 projecting therefrom so that a template having an outer surface of revolution may be mounted thereon instead of the flat template 18 shown in the figures.

The template guide 19 is guided in the dove-tailed groove of the support means 1 along a path extending substantially parallel to the axis A—A between an extended position as shown in FIGS. 1 and 5 and a retracted position in which the cross arm 13 of the support means 1 is closer to the left end, as viewed in FIG. 1, of the template guide 19 than in the extended position thereof. The left end, as viewed in FIG. 1, of the template guide 19 carries fixedly thereto a cross arm 191 which at its free end has an annular portion on which an abutment ring 192 is turnably mounted by means of a ball bearing, as best shown in FIG. 4.

A coil compression spring 20 abutting with opposite ends thereof against the template guide 19 and an abutment plate 110 fixed to the support means 1 is biased to move the template guide 19 to its extended position as shown in FIGS. 1 and 5 from which the template guide 19 may be pushed against the force of the spring 20 to a retracted position until the head of a screw 193 (FIG. 5) adjustably screwed into the left end, as viewed in FIG. 5, of the template guide 19 abuts against the abutment plate 110. The screw 193 and the plate 110 form therefore adjustable limiting means cooperating with the template guide and the support means for limiting movement of the template guide from the extended to the retracted position.

The cross arm 13 of the support means 1 is provided with a bore coaxial with the axis A—A in which a guide sleeve 21 for the workpiece W is exchangeably mounted in any convenient manner. The guide sleeve 21 is provided with a coaxial bore 210 having a diameter which substantially corresponds to the outer diameter of the workpiece before the latter is machined.

The copying attachment above described will operate as follows:

The cross arm 11 of the support means 1 is fixed to the center pin of a tail stock R of a lathe, the turret head of a turret lathe or a similar machine element of a machine tool which is movable in direction of the axis A—A.

The workpiece W which is to be rotated about the axis A—A is mounted in the chuck B of the head stock of a lathe or a similar drive and clamping member of a machine tool to project therefrom coaxial with the axis A—A. During movement of the tail stock R towards the left, as viewed in FIG. 1, the abutment ring 192 will first be moved over the right end of the workpiece W and subsequently thereto the sleeve 21 will be moved over the workpiece so that the outer surface of the latter is guided in the bore 210 of the sleeve.

After the abutment ring 192 has contacted the chuck B, further movement of the template guide 19 toward the left, as viewed in FIG. 1, will be stopped so that further movement of the tail stock R toward the left will cause relative movement of the template guide 19 and the support means 1 and the template guide 19 will move against the force of the spring 20 relative to the support means 1 from its extended to its retracted position. During this relative movement in the direction P as shown in FIG. 5 the pointed end 171 of the feeler pin 17 will ride on the control face 180 of the template 18 and this movement will be transmitted through the lever 16 to the tool holder means 14 so that the cutting end of the cutting tool D will be moved in correspondence to the contour of the control face 180 to machine thereby the workpiece W correspondingly.

By turning the lever 162 the relationship of the cam 163 to the head 170 of the feeler pin 17 may be changed and for instance the lever 162 may be turned in counter clockwise direction from the position shown in FIG. 3 so that the flat face 164 of the cam will abut against the end of the head 170 during a first roughing cut, whereas after turning the lever to the position 162 a second finishing cut may be taken. If a very fine finishing of the workpiece is required the position of the cutting tool may after the second cut also be adjusted by turning the head 170 on the threaded end of the feeler pin 17 whereby the depth of the subsequent cut may be properly adjusted by means of the scale on the head 170.

As indicated in dotted lines in FIG. 1, the tail stock may also be provided with a centering drill Z which at the end of the advancing movement of the tail stock will act on the workpiece W.

While FIG. 1 illustrates the arrangement of the copying attachment on a lathe or a similar machine tool in which the workpiece W is rotated about its axis, while the cutting attachment is advanced in direction of the rotating axis of the workpiece, FIG. 2 shows an arrangement in which the workpiece is held stationarily on the workpiece holder H of a drilling machine, whereas the copying attachment, respectively the cross arm 11 of the support means 1 thereof is mounted on the rotating spindle S of the drilling machine so that the copying attachment during rotation of the spindle S will rotate with the latter about the axis of the stationary workpiece W. The operation of the copying attachment during use thereof on a drilling machine as shown in FIG. 2 will be substantially the same as described above. When the spindle S of the drilling machine is lowered, the abutment ring 192 will be pushed over the stationary workpiece W until the abutment ring 192 will abut against an upper portion of the workpiece holder H. During further downward movement of the spindle S the template guide 19 will be moved relative to the support means 1 from the extended to the retracted position thereof which in turn will cause movement of the other elements of the copying machine in the manner as described above.

It will be understood that each of the elements described above, or two or more together, may also find a useful application in other types of copying attachments differing from the type described above.

While the invention has been illustrated and described as embodied in a copying attachment having support means attachable to a component movable in direction of the axis of the workpiece to be machined and a template guide guided on the support means parallel to the axis of the workpiece and carrying abutment ring means coaxial with said axis and adapted to abut against a member of the machine tool on which the workpiece is mounted to cause relative movement of the support means and the template guide, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A copying attachment for a machine tool equipped with a workpiece holder for carrying a workpiece, said copying attachment comprising, in combination, elongated support means adapted to be connected at one end thereof to said workpiece holder;
   tool holder means for holding a cutting tool and being mounted in the region of the other end of said support means movable in a direction substantially normal to the axis of a workpiece carried by said workpiece holder;
   a template guide guided on said support means along a path extending substantially parallel to said axis between an extended position and a retracted position in which one end of said template guide is closer to said other end of said support means than in said extended position;
   a template having an elongated control face and being fixedly mounted on said template guide with said elongated control face extending in direction of said axis;
   abutment ring means fixed to said one end of said template guide and having an axis coinciding with the axis of the workpiece, said abutment ring means adapted to partly surround the workpiece and to abut with an end face thereof against said workpiece holder;
   a feeler pin having one end engaging said control face and being mounted on said support means movable in a direction normal to said axis;
   and connecting means connecting the other end of said feeler pin to said tool holder means for movement of the latter simultaneously with said feeler pin.

2. A copying attachment for a machine tool equipped with a workpiece holder for carrying a workpiece, said copying attachment comprising, in combination, elongated support means adapted to be connected at one end thereof to said workpiece holder;
   tool holder means for holding a cutting tool and being mounted in the region of the other end of said support means movable in a direction substantially normal to the axis of a workpiece carried by said workpiece holder;
   a template guide guided on said support means along a path extending substantially parallel to said axis between an extended position and a retracted position in which one end of said template guide is closer to said other end of said support means than in said extended position;
   resilient means operatively connected to said template guide and biased so as to tend to maintain the latter in said extended position;
   a template having an elongated control face and being fixedly mounted on said template guide with said elongated control face extending in direction of said axis;
   abutment ring means fixed to said one end of said template guide and having an axis coinciding with the axis of the workpiece, said abutment ring means adapted to partly surround the workpiece and to abut with an end face thereof against said workpiece holder;
   a feeler pin having one end engaging said control face and being mounted on said support means movable in a direction normal to said axis;
   and connecting means connecting the other end of said feeler pin to said tool holder means for movement of the latter simultaneously with said feeler pin.

3. A copying attachment for a machine tool equipped with a workpiece holder for carrying a workpiece, said copying attachment comprising, in combination, elongated support means adapted to be connected at one end thereof to said workpiece holder;
   tool holder means for holding a cutting tool and being mounted in the region of the other end of said support means movable in a direction substantially normal to the axis of a workpiece carried by said workpiece holder;
   a template guide guided on said support means along a path extending substantially parallel to said axis between an extended position and a retracted position in which one end of said template guide is closer to said other end of said support means than in said extended position;
   resilient means operatively connected to said template guide and biased so as to tend to maintain the latter in said extended position;
   a template having an elongated control face and being fixedly mounted on said template guide with said elongated control face extending in direction of said axis;
   abutment ring means fixed to said one end of said template guide and having an axis coinciding with the axis of the workpiece, said abutment ring means adapted to partly surround the workpiece and to abut with an end face thereof against said workpiece holder;
   a feeler pin having an axis extending parallel to the direction of movement of said tool holder means, said feeler pin being mounted movable in the direction of its axis on said support means and having one end engaging said control face of said template; and connecting means connecting the other end of said feeler pin to said tool holder means for movement of the latter simultaneously with said feeler pin, said connecting means comprising a lever pivoted intermediate its ends on said support means and operatively connected at opposite ends thereof to said tool holder means and said feeler pin, respectively.

4. A copying attachment for a machine tool equipped with a workpiece holder for carrying a workpiece, said copying attachment comprising, in combination, elongated support means adapted to be connected at one end thereof to said workpiece holder;
   tool holder means for holding a cutting tool and being mounted in the region of the other end of said support means movable in a direction substantially normal to the axis of a workpiece carried by said workpiece holder;
   a template guide guided on said support means along a path extending substantially parallel to said axis between an extended position and a retracted position in which one end of said template guide is closer to said other end of said support means than in said extended position;
   resilient means operatively connected to said template guide and biased so as to tend to maintain the latter in said extended position;
   adjustable limiting means cooperating with said template guide and said support means for limiting movement of said template guide from said extended to said retracted position;

a template having an elongated control face and being fixedly mounted on said template guide with said elongated control face extending in direction of said axis;

abutment ring means fixed to said one end of said template guide and having an axis coinciding with the axis of the workpiece, said abutment ring means adapted to partly surround the workpiece and to abut with an end face thereof against said workpiece holder;

a feeler pin having one end engaging said control face and being mounted on said support means movable in a direction normal to said axis;

and connecting means connecting the other end of said feeler pin to said tool holder means for movement of the latter simultaneously with said feeler pin.

5. A copying attachment for a machine tool equipped with a workpiece holder for carrying a workpiece, said copying attachment comprising, in combination, elongated support means adapted to be connected at one end thereof to said workpiece holder;

tool holder means for holding a cutting tool and being mounted in the region of the other end of said support means movable in a direction substantially normal to the axis of a workpiece carried by said workpiece holder;

a template guide guided on said support means along a path extending substantially parallel to said axis between an extended position and a retracted position in which one end of said template guide is closer to said other end of said support means than in said extended position;

resilient means operatively connected to said template guide and biased so as to tend to maintain the latter in said extended position;

adjustable limiting means cooperating with said template guide and said support means for limiting movement of said template guide from said extended to said retracted position; said limiting means comprising an adjustable screw extending in direction of said axis and threadingly connected to said template guide movable with the latter along said path; and an abutment plate fixed to said support means and located in the path of said screw;

a template having an elongated control face and being fixedly mounted on said template guide with said elongated control face extending in direction of said axis;

abutment ring means fixed to said one end of said template guide and having an axis coinciding with the axis of the workpiece, said abutment ring means adapted to partly surround the workpiece and to abut with an end face thereof against said workpiece holder;

a feeler pin having one end engaging said control face and being mounted on said support means movable in a direction normal to said axis;

and connecting means connecting the other end of said feeler pin to said tool holder means for movement of the latter simultaneously with said feeler pin.

6. A copying attachment for a machine tool equipped with a workpiece holder for carrying a workpiece, said copying attachment comprising, in combination, elongated support means adapted to be connected at one end thereof to said workpiece holder;

tool holder means for holding a cutting tool and being mounted in the region of the other end of said support means movable in a direction substantially normal to the axis of a workpiece carried by said workpiece holder;

a template guide guided on said support means along a path extending substantially parallel to said axis between an extended position and a retracted position in which one end of said template guide is closer to said other end of said support means than in said extended position;

a template having an elongated control face and being fixedly mounted on said template guide with said elongated control face extending in direction of said axis;

abutment ring means fixed to said one end of said template guide and having an axis coinciding with the axis of the workpiece, said abutment ring means adapted to partly surround the workpiece and to abut with an end face thereof against said workpiece holder;

a feeler pin having one end engaging said control face and being mounted on said support means movable in a direction normal to said axis;

connecting means connecting the other end of said feeler pin to said tool holder means for movement of the latter simultaneously with said feeler pin;

and means cooperating with said feeler pin and said tool holder means for changing the position of the latter relative to said feeler pin for moving a cutting tool carried by said tool holder means between a roughing and a finishing position.

7. A copying attachment for a machine tool equipped with a workpiece holder for carrying a workpiece, said copying attachment comprising, in combination, elongated support means adapted to be connected at one end thereof to said workpiece holder;

tool holder means for holding a cutting tool and being mounted in the region of the other end of said support means movable in a direction substantially normal to the axis of a workpiece carried by said workpiece holder;

a template guide guided on said support means along a path extending substantially parallel to said axis between an extended position and retracted position in which one end of said template guide is closer to said other end of said support means than in said extended position;

resilient means operatively connected to said template guide and biased so as to tend to maintain the latter in said extended position;

a template having an elongated control face and being fixedly mounted on said template guide with said elongated control face extending in direction of said axis;

abutment ring means fixed to said one end of said template guide and having an axis coinciding with the axis of the workpiece, said abutment ring means adapted to partly surround the workpiece and to abut with an end face thereof against said workpiece holder;

a feeler pin having an axis extending parallel to the direction of movement of said tool holder means, said feeler pin being mounted movable in the direction of its axis on said support means and having one end engaging said control face of said template;

connecting means connecting the other end of said feeler pin to said tool holder means for movement of the latter simultaneously with said feeler pin, said connecting means comprising a lever pivoted intermediate its ends on said support means and engaging at one end thereof said tool holder means;

and a cam turnably mounted on the other end of said lever and having a cam face engaging the other end of said pin so that by turning said cam the position of said tool holder means relative to said feeler pin may be changed for moving a cutting tool carried by said tool holder means between a roughing and a finishing position.

8. A copying attachment as set forth in claim 7, and including a head threadingly connected to said other end of said feeler pin adjustable in longitudinal direction of the latter and engaged by said cam face, and a scale on said head for reading the position of the latter relative to said feeler pin.

9. A copying attachment as set forth in claim 3, and including resilient means operatively connected to said tool holder means and biased so as to tend to move the latter away from said axis and to keep thereby said one end of said feeler pin in engagement with said control face of said template.

10. A copying attachment as set forth in claim 1, wherein said template guide has an elongated portion of dovetailed cross-section guided in a corresponding groove of said support means.

11. A copying attachment as set forth in claim 1, wherein said abutment ring means has an annular portion fixed to said one end to said template guide, and a ring turnably mounted on said annular portion.

12. A copying attachment as set forth in claim 11 and including anti-friction bearing means for turnably mounting said ring on said annular portion.

No references cited.

WILLIAM W. DYER, Jr., *Primary Examiner.*

G. A. DOST, *Assistant Examiner.*